(12) United States Patent
Kassemi et al.

(10) Patent No.: US 12,248,917 B2
(45) Date of Patent: *Mar. 11, 2025

(54) SYSTEM AND METHOD FOR TWO-CLICK VALIDATION

(71) Applicant: SWOOP IP HOLDINGS LLC, Wilmington, DE (US)

(72) Inventors: James Kassemi, Albuquerque, NM (US); Lawrence Glen Holcomb, Albuquerque, NM (US); Dave Walz-Burkett, Albuquerque, NM (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,993

(22) Filed: Aug. 23, 2023

(65) Prior Publication Data
US 2023/0394451 A1 Dec. 7, 2023

Related U.S. Application Data

(63) Continuation of application No. 17/225,051, filed on Apr. 7, 2021, now Pat. No. 11,775,948, which is a continuation of application No. 16/298,218, filed on Mar. 11, 2019, now Pat. No. 11,017,366, which is a continuation of application No. 14/299,726, filed on Jun. 9, 2014, now Pat. No. 10,229,400.

(60) Provisional application No. 61/832,502, filed on Jun. 7, 2013.

(51) Int. Cl.
*G06Q 20/38* (2012.01)
*G06Q 20/12* (2012.01)

(52) U.S. Cl.
CPC ....... *G06Q 20/12* (2013.01); *G06Q 20/38215* (2013.01)

(58) Field of Classification Search
CPC ...................................... G06Q 20/12
USPC .......................................... 705/76
See application file for complete search history.

(56) References Cited

U.S. PATENT DOCUMENTS

| 6,175,823 B1 * | 1/2001 | Van Dusen ........ G06Q 30/0635 705/26.81 |
| 11,017,366 B2 * | 5/2021 | Kassemi ............... G06Q 20/027 |
| 11,775,948 B2 * | 10/2023 | Kassemi ............... G06Q 20/384 705/76 |

(Continued)

*Primary Examiner* — Chinedu C Agwumezie
(74) *Attorney, Agent, or Firm* — VOLPE KOENIG

(57) ABSTRACT

A method to enable transactions comprising transmitting, by a vendor server, a request message to the e-commerce system for a token. Receiving a token in response to the request message. Generating an offer message including a mailto hyperlink, wherein the offer message is an email message including a mailto hyperlink is configured to generate an email reply message include the token. Transmitting the offer message to an email address associated with the customer. Receiving a response message from the e-commerce system, the response message including transaction details that confirm the token was validated by the e-commerce system. Transmitting a payment processing request message to a payment processor, wherein the payment processing request is based on the transaction details. Receiving a notification from the payment processor, that payment processing has been completed. Transmitting an email message to the email address of the customer, that payment has been processed.

18 Claims, 9 Drawing Sheets

(56) References Cited

U.S. PATENT DOCUMENTS

| | | | |
|---|---|---|---|
| 2007/0006139 A1* | 1/2007 | Rubin | G06F 16/00 |
| | | | 717/106 |
| 2007/0061396 A1* | 3/2007 | Morris | G06Q 10/02 |
| | | | 709/203 |
| 2007/0277201 A1* | 11/2007 | Wong | H04N 21/47214 |
| | | | 725/40 |
| 2013/0160099 A1* | 6/2013 | Fitzpatrick, III | H04L 9/3213 |
| | | | 726/7 |

* cited by examiner

SYSTEM AND METHOD FOR TWO-CLICK VALIDATION

CROSS REFERENCE TO RELATED APPLICATIONS

This application is a continuation of U.S. patent application Ser. No. 17/225,051, filed Apr. 7, 2021, which is a continuation of U.S. patent application Ser. No. 16/298,218 filed Mar. 11, 2019, now U.S. Pat. No. 11,017,366 issued on May 25, 2021, which is a continuation of U.S. patent application Ser. No. 14/299,726, filed Jun. 9, 2014, now U.S. Pat. No. 10,229,400 issued on Mar. 12, 2019, which claims the benefit of U.S. Provisional Application Ser. No. 61/832,502 and filed Jun. 7, 2013, which are incorporated by reference as if fully set forth.

FIELD OF INVENTION

The present invention is related to electronic payment systems.

BACKGROUND

In some systems, an email payment gateway may require making email-based payments with a strict sequence of actions and processes within an e-commerce system. To create greater flexibility for vendors and greater variety in the functionality of an email-based payment system, the e-commerce system may need greater flexibility in the processes implemented within its e-commerce system. Vendors and customers may request more choices in the process and more flexibility in the arrangement of the system. An e-commerce system may receive a mass of email based transactions with different requirements. An e-commerce system that can parse different email-based transactions into one of a plurality of appropriate process categories would be welcome in the marketplace.

Currently, vendors wishing to adopt an email-based payment method must integrate their existing system with the new email-based system. For many vendors this may represent an unwelcome disruption to their own process and redundancies between the two systems. Some vendors may not wish to disrupt or relocate their payment processing relationship to adopt an additional payment option. A system that allows a vendor access to email-based payment validation technology, but still allows them to maintain their existing payment processing information would address this vendor requirement.

There is a segment of online vendors that require a complex and constantly shifting configuration of their payment processing systems. They need to be able to frequently change the layout of their systems. Substituting gateways and changing the criteria for processing payments may be fundamental to their process. Use of multiple payment gateways, variations based on segmentation of their process and distinctions between location, payment amounts and quantities may require that they maintain full control of the payment processing relationship and therefore cannot delegate that relationship to another party.

Online security is a major concern for any vendor. In an email-based checkout process security tokens may be used. Allowing the vendor to oversee the relationship with the payment process provides the merchant greater assurances and control, but still allows them access to an email-based payment system. By maintaining the payment process within the vendor's system it also limits the amount of communication required to complete an email-based transaction thereby reducing the vendor's exposure.

Email-based payment processing may benefit if components of the system could be managed by a third party or could offer services related to payment processing and allow the customer to select those options by sending a secure email. Currently email-based payment processing is a service where only payments can be made by email but all other ancillary requests are URL based. An e-commerce system that could integrate those commands into the same email request system would be a welcome extension to the logic of email based payment processing.

SUMMARY

This system and methods described herein may include a version frame in a token that enables the e-commerce system to discriminate between the any number of processes required within the token. One example of this use is that this removes the vendor's dependency on a specific payment processor. In system described herein, the email-based e-commerce system does not communicate directly with any financial service provider. The merchant embeds tokens into advertising emails, which are sent in an email message to customers. When a customer responds to an offer, the token is sent to the email-based e-commerce system, where the token's validity is confirmed. The email-based e-commerce system notifies the vendor of the purchaser and their purchase details, and its success or failure during the validation. The merchant handles the direct communication to the payment gateway to charge the purchase. This requires that the email-based e-commerce system can distinguish between tokens intended for this validation process from those that require payment processing.

A method to enable transactions comprising transmitting, by a vendor server, a request message to the e-commerce system for a token. Receiving a token in response to the request message. Generating an offer message including a mailto hyperlink, wherein the offer message is an email message including a mailto hyperlink is configured to generate an email reply message include the token. Transmitting the offer message to an email address associated with the customer. Receiving a response message from the e-commerce system, the response message including transaction details that confirm the token was validated by the e-commerce system. Transmitting a payment processing request message to a payment processor, wherein the payment processing request is based on the transaction details. Receiving a notification from the payment processor, that payment processing has been completed. Transmitting an email message to the email address of the customer, that payment has been processed.

DETAILED DESCRIPTION

The methods described in greater detail hereafter may allow a vendor to maintain control of their payment processing relationship. This may reduce the integration requirements for a vendor.

The methods and apparatus described hereinafter may introduce a token that the e-commerce system may separate into processing, validation or any other separate processes, thereby creating more flexibility in the system. Validation may be used, by the system, when the vendor holds the payment processing.

The methods and apparatus described herein may allow vendors to keep their members registered exclusively to themselves.

The methods and apparatus described herein may adjust the work load for the e-commerce system to authenticating tokens and reducing e-commerce system's need to maintain or recognize if an individual is registered.

When used herein, the term "token" may refer a sequence of byte data or string or file used to authenticate a transaction. A token may be one or multiple encrypted strings, files, passwords, cyphers or other data which may contain information used to perform or authenticate a transaction when sent to e-commerce systems. These tokens may be encrypted using a public-private key encryption system. The vendor or a party with knowledge of the vendor's private key may generate an encrypted token. Alternatively, a payment system or e-commerce site may generate this token on behalf of the vendor.

Disclosed herein are processor-executable methods, computing systems, and related technologies for a vendor token generator for e-commerce transactions. The system and method may use an email server/account to complete checkout of any type of product (e.g., items/services/events/donations) for a transfer of funds from a customer to a vendor (e.g. retail site, charity, political organization or other vendor.) While the technologies described herein are described using e-mail as an example, they may also be applicable to similar communication mediums, such as SMS and MMS communication channels.

Figure 1:
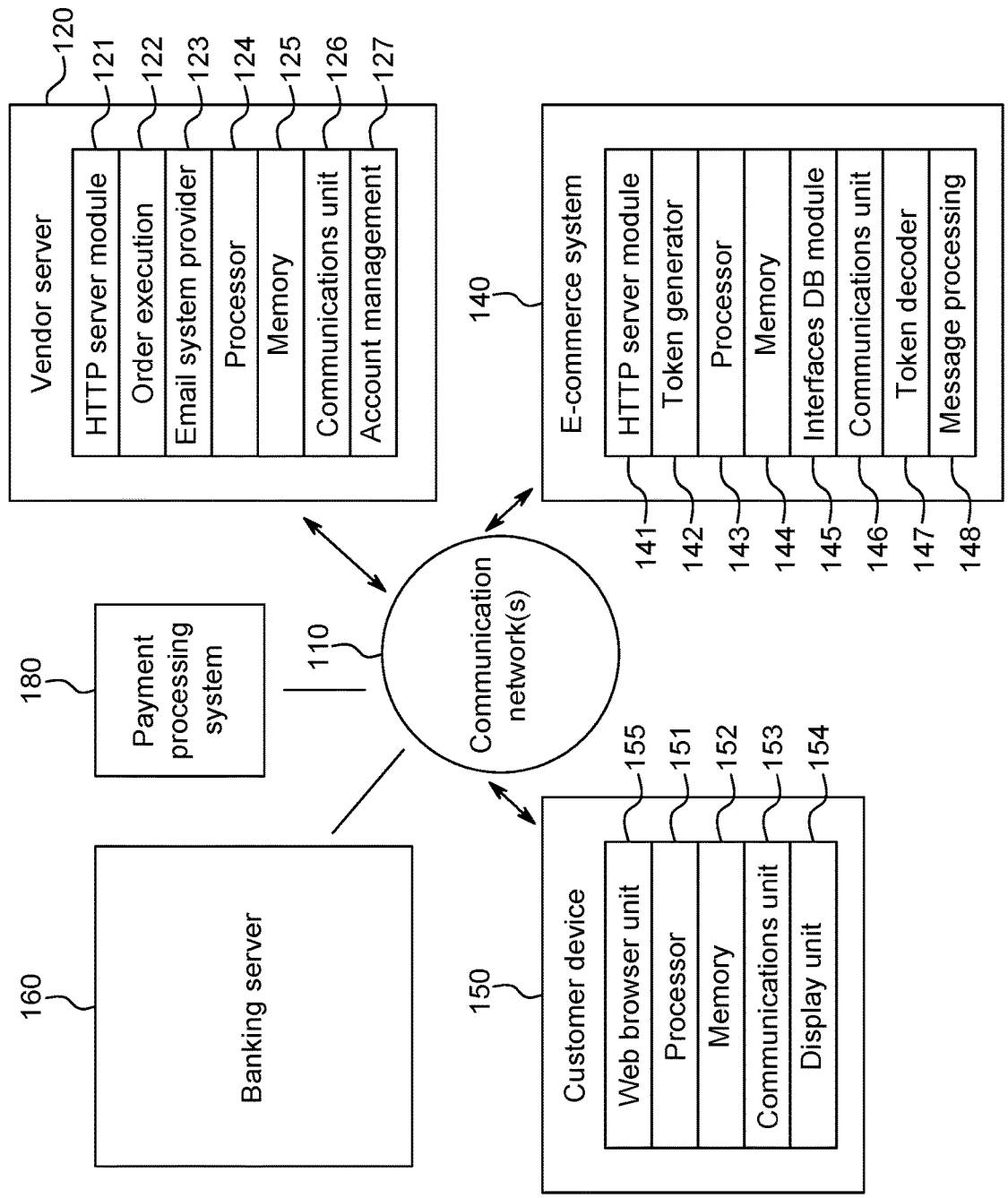
FIG. 1 is a block diagram of an example system for email-based transaction.

FIG. 1 shows an example system 100 that may be used for two-click validation that may be used in e-commerce transactions. The example system 100 includes a customer device 150, a vendor server 120, an e-commerce system 140, a payment processor 180, and a banking server 160 that may communicate over one or more wired and/or wireless communication networks 110. The wired or wireless communication networks 110 may be public, private or a combination of public or private networks.

The customer device 150 may be, for example, a cellular phone, a smartphone, a desktop computer, a laptop computer, a tablet computer, or any other appropriate computing device. The customer device 150 includes a processor 151, memory 152, a communications unit 153, a display unit 154 and web browser unit 155, which may communicate data to/from the web server module(s) in the vendor server 120 and e-commerce system 140. The web browser unit 155 may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit 155 may implement Rich Internet Application (RIA) and/or multimedia technologies such as ADOBE FLASH and/or other technologies compatible with Internet based communications. The web browser unit 155 may implement RIA and/or multimedia technologies using one or web browser plug-in modules (e.g., ADOBE FLASH), and/or using one or more sub-modules within the web browser unit 155 itself. The web browser unit 155 may display data on one or more display devices that are included in, or connected to, the customer device 150, such as a liquid crystal display (LCD) display or monitor. The customer device 150 may receive input from the user of the customer device 150 from input devices (not depicted) that are included in, or connected to, the customer device 150, such as a keyboard, a mouse, a microphone or a touch screen, and provide data that indicates the input to the web browser unit 155.

The vendor server 120 may include an HTTP server module 121, an order execution unit 122, an email system provider 123, a processor 124, memory 125, and a communications unit 126, and an account management unit 127.

The HTTP server module 121 provides a website that may be accessed by a customer device 150. The HTTP server module 121 may implement the HTTP protocol, and may communicate Hypertext Markup Language (HTML) pages and related data from the website to/from the customer device 150 using HTTP. The vendor server 120 may be connected to one or more private or public networks (such as the Internet), via which the HTTP server module 121 communicates with devices such as the customer device 150. The HTTP server module 121 may generate one or more web pages and may communicate the web pages to the customer device 150, and may receive responsive information from the customer device 150.

The HTTP server module 121 may be, for example, an NGINX server, an APACHE HTTP server, a SUN-ONE Web Server, a MICROSOFT INTERNET Information Services (IIS) server, and/or may be based on any other appropriate HTTP server technology. The vendor server 120 may also include one or more additional components or modules (not depicted), such as one or more load balancers, firewall devices, routers, switches, and devices that handle power backup and data redundancy.

The order execution unit 122 is configured to receive instructions from received messages and executes orders on behalf of the vendor server 1220.

The email system provider 123 may serve as an outbound email service provider, mailbox provider and administrator of a registered domain name associated with the vendor server 120. The email system provider may be configured to facilitate delivery of inbound and outbound emails. The email system provider 123 may further be configured to specify the vendor reads/writes/and communicates emails. While the email system provider 123 is shown as being incorporated in the vendor server 120, this is shown as an example only. The vendor may use an outside (i.e. third party) email system provider 123. In this case, the token might be provided to the email system provider 123 for email campaigns.

The memory 125 may be configured to store information associated with e-commerce transactions. This may include inventory information, information used to generate web pages, customer information, and other e-commerce data.

The communications unit 126 may be configured to transmit/receive communications via the communication network 110 or other inputs/outputs.

The account management unit 127 is configured to manage accounts registered with the vendor server 120. A customer, wishing to complete a transaction with a vendor server 120 may register his/her email address and payment information with the vendor server 120. The account management unit 127 may be configured to store a customer registry.

The e-commerce system 140 may include an HTTP server module 141, a token generator 142, a processor 143, memory 144, interfaces database module 145, communications unit 146, token decoder 147, and a message processing unit 148. While only one vendor server 120 is shown communicating with the e-commerce system 140, this is shown as an example only. E-commerce system 140 may communicate with multiple vendor servers 120. Similarly, vendors may register with the e-commerce system 140. The e-commerce system 140 may provide the vendor server 120 with a public key and private key to be used in token transaction in accordance with the methods described herein. When a transaction is attempted (e.g. request to purchase goods, donate money), the e-commerce system 140 decodes the token, authenticates the sender of the email, which may allow the vendor server 120 to process the transaction. While the e-commerce system 140 is depicted as a separate entity in FIG. 1, this is shown as an example only. The e-commerce system 140 may be controlled and/or co-located with the vendor server 120, the banking server 160.

The token generator 142 may generate tokens for use in e-commerce transactions. Tokens may be encrypted strings which contain information to perform a transaction when sent to the e-commerce system(s) 140. A token may be one or multiple encrypted strings, files, passwords, cyphers or other data which may contain information used to perform or authenticate a transaction.

The token decoder 147 may be configured to decode tokens received from external sources, such as a vendor server 120 or a customer device 150.

The message processing unit 148 is configured to analyze received messages and communicate with the token decoder 147 to determine if the received message is valid and to identify the request embedded in the message (e.g. request for purchase of goods). If the token decoder 147 indicates the token is valid, the message processing unit 148 may then access the account management unit 149 to verify a transaction.

The interfaces database module 145 serves as an interface to databases associated with the e-commerce system 140.

The banking server 160 may be controlled by a third party system bank. The e-commerce system 140 may communicate with the banking server 160 to verify that the customer has adequate funds or credit for the requested purchase. For example, the banking server 160 may be a controlled by VISA, AMERICAN EXPRESS, MASTERCARD or any other bank or banking or financial network that a customer may use for online payment. The banking server 160 may be a server for virtual currencies, such as BITCOIN, etc.

An email-based e-commerce system 140 may allow vendors to send advertising emails with a mailto-hyperlink associated with a specific product offer and select the mailto-hyperlink and generate a response email by selecting the mailto-hyperlink. This response email contains a token and is addressed to the e-commerce system 140. Once sent, this response email confirms the customer's purchase of the product by parsing the information in the token. The e-commerce system 140 processes the payment and notifies the vendor and the customer. The e-commerce system 140 may comprises a token generator, components for processing the tokens and a components for processing the payments and a system for notifying the vendor server 120 of the transaction details.

As described herein, in greater detail, the methods and apparatus described herein allow the e-commerce system 140 to perform one of several processes; the particular process may be designated by the token in the email received by the e-commerce system 140.

Referring back to the example system in FIG. 1, the payment processor 180 is not located in the e-commerce system 140 but is located in the vendor server 120. This system arrangement allows for a secure integration of an email-based e-commerce system with a vendor. The email-based e-commerce system may use unique validation tokens that allow the system to function securely.

While the example system shown in FIG. 1 shows the e-commerce system 140 comprising the token generator 142, the token generator 142 this is shown as an example only. The vendor server 120 may also include a token generator that allows vendors to directly create tokens. In another example, a third party may have a token generator 142 to create tokens for use by the vendor server 120.

Figure 2:
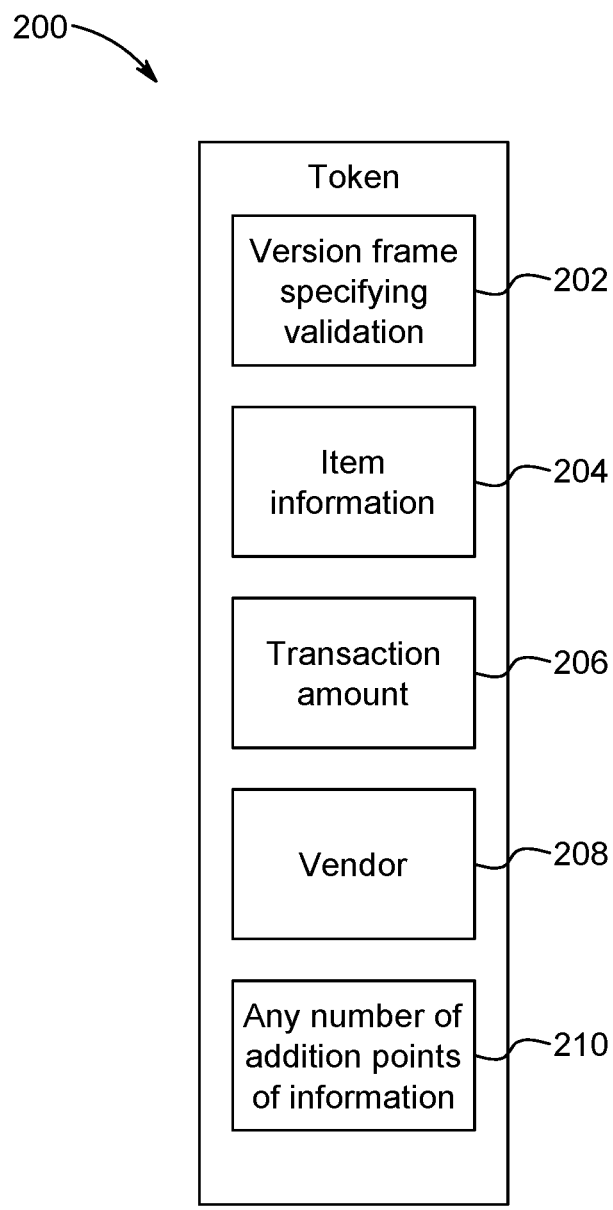
FIG. 2 is a diagram of an example validation token.

FIG. 2 is a diagram of an example validation token 200. The validation token 200 may allow the system 100 to locate the payment processing in the vendor server 120 (or other third party). This may allow the vendor to use its own payment processor, third party payment processors, or use the e-commerce system 140 as a payment processor. For example, the validation token may include an IP address, a MAC address or some other address information and/or identification that allows the e-commerce system 140 to locate the payment processor. As shown in FIG. 2, validation token 200 includes version frame information 202, an item information 204, a transaction amount 206, a vendor information 208, and one or more additional points of information 210. The version frame information 202 may allow the e-commerce system 140 to process an incoming email and initiate a transaction in a third party environment on behalf of a registered customer (e.g. vendor). Including version frame information 202 in the token 200 allows the system to distinguish between token types and behaviors and signals to the e-commerce system 140 the requirements of the request. The e-commerce system 140 may receive a token via an email message from a customer device or from a message from a vendor server website. The token decoder 147 may parse the received token, thereby decoding the version frame information 202 to determine version information. If the e-commerce system 140 determines that the version information indicates that the token represents a validation request, the e-commerce system 140 may be configured to contact the associated third party (identified in the received token) informing third part system that the individual (identified in the token) wishes to make a purchase. This notification may occur via an HTTP message sent to a URI specified by the vendor for this purpose.

Figure 6:
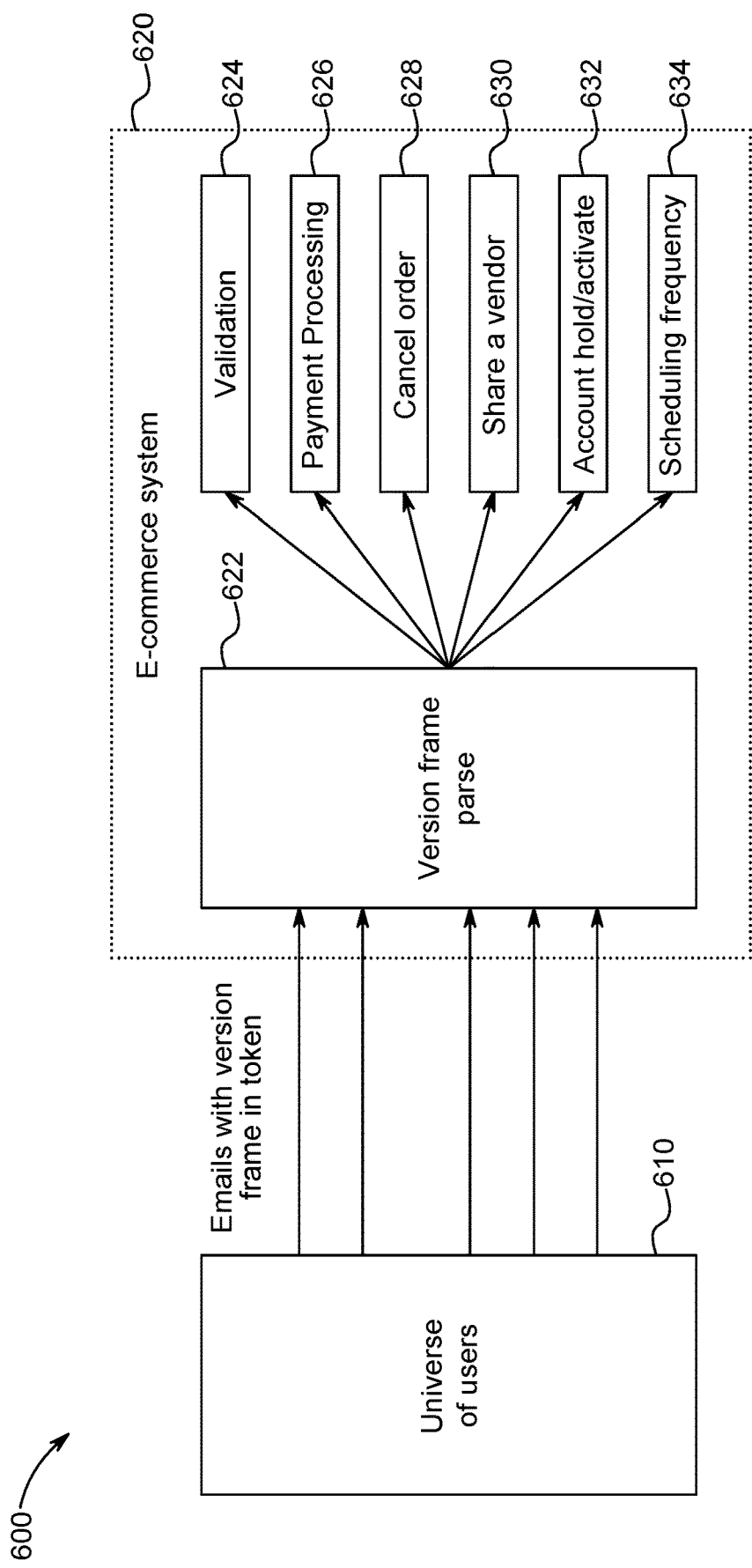
FIG. 6 is a flow diagram illustrating how the version frame might be used for different processes.

FIG. 6 is a block diagram that shows uses for the version frame for different processes. In addition to being able to locate the payment processing to the vendor or third party, the use of the version frame in the token allows for the e-commerce system 620 to parse tokens into different categories of requests that may be processed in the e-commerce system 620 or by a third party. The universe of users 610 may transmit email messages, each including a token 200 that includes a version frame. The e-commerce system 620 may receive these emails and may include a unit to parse the version frame 622. Based on the version frame information, the e-commerce system may be configured to perform a token validation 624. Alternatively, the version frame information may notify the e-commerce system 620 to use the version frame information to perform payment processing 626. In another example, the version frame information may notify the e-commerce system 620 that the token is to be used in a share-a-vendor 630, e.g. vendor A includes a mailto hyperlink in their email advertisement that would share membership and account info with vendor B. The result being that both vendors share a customer. This may be used in cross promotions.

The version frame information may be configured to notify the e-commerce system 620 to request to cancel the transaction previously submitted 628, as is described in greater detail hereafter.

The version frame information may be configured to notify the e-commerce system 620 to freeze the capacity to make purchases on the account until the further notice 632. This notice may need to come from logging into an account via a URL or by just sending an email.

The version frame information may be configured to notify the e-commerce system 620 allow customers to adjust the frequency of offers received 634. (E.g., the user may request to send information every day, week, or month).

Figure 3:
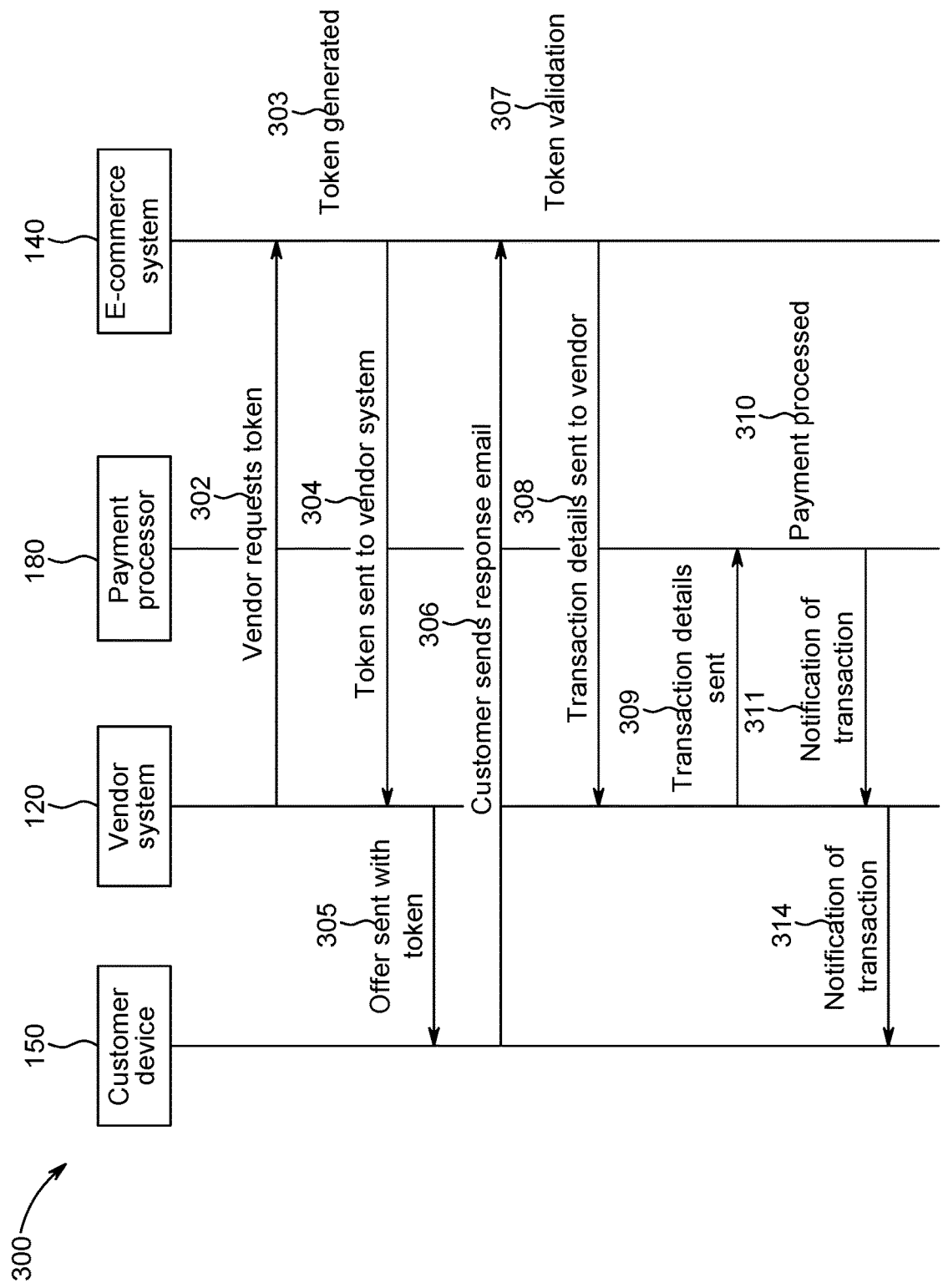
FIG. 3 is a transactional diagram showing the processing of a basic transaction.

FIG. 3 is a transactional diagram showing a basic transaction for a validation process using a validation token 200 where the e-commerce system 140 generates the tokens. The vendor server 120 may transmit a message to the e-commerce system 140 to request a token (step 302). The e-commerce system 140 generates the token (step 303). The e-commerce system 140 transmits the token to the vendor server 120 (step 304). The vendor server 120 may then transmit an offer message in the form of an advertisement, or payment request, etc. with the token (step 305). This offer may be, for example, in an email message, where the token is embedded or attached to the email message. The customer may open the offer message using a customer device 150. The customer may send a response email by using a mailto hyperlink embedded in the offer message (step 306). The e-commerce system 140 receives the response email and validates the token (step 307). Once the token is validated, the e-commerce system 140 may send the transaction details to the vendor server 120 (step 308). The vendor server 120 parses the transaction details and passes along transaction email to the payment processor 180 (step 309). The payment processor 180 may then process the payment (step 310) and notify the vendor server 120 that the payment has been processed (step 311). Once the payment has been processed, the vendor server 120 may send a notification that the transaction has been processed to the customer device 150.

Figure 4:
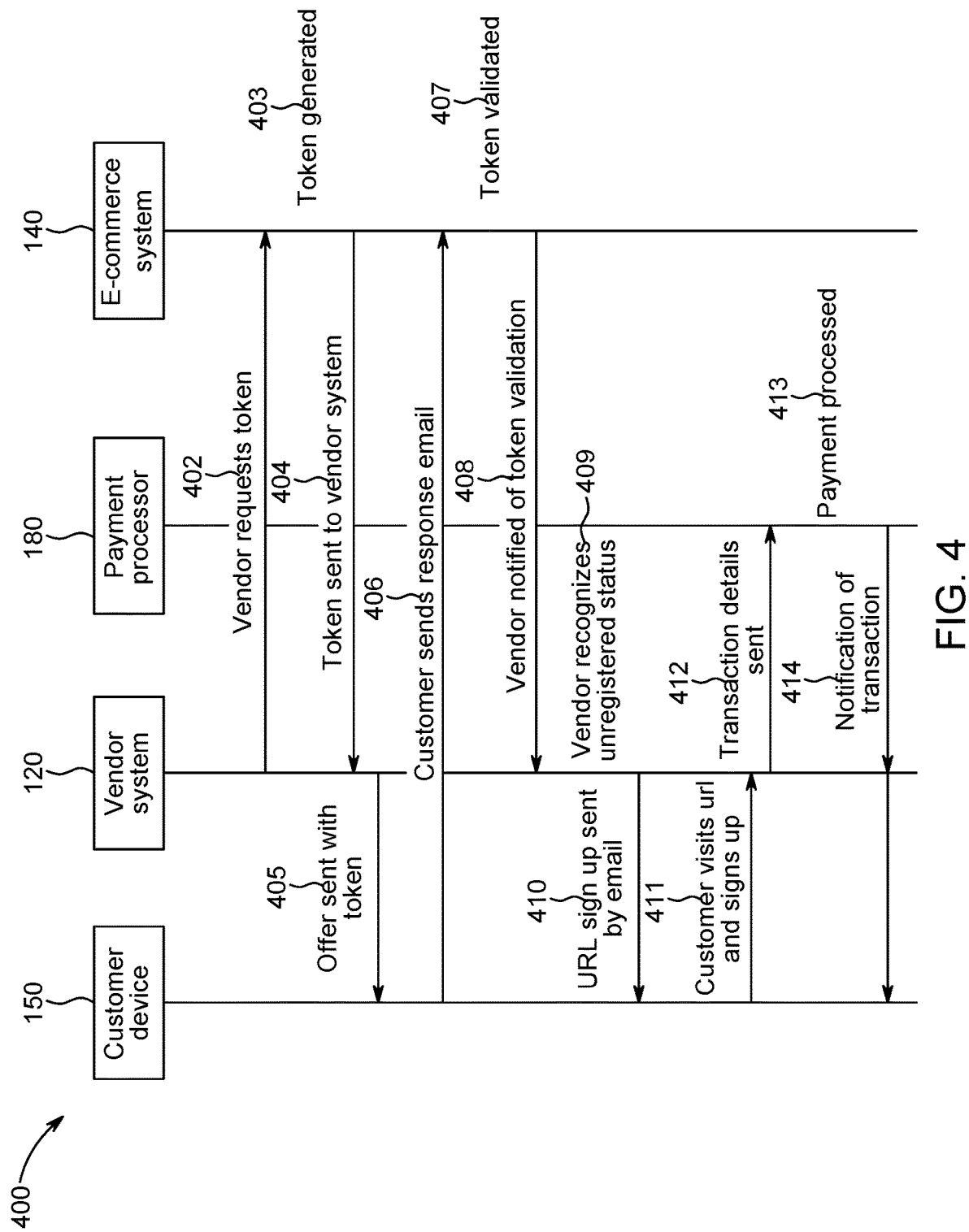
FIG. 4 is a transactional diagram showing the process for registration.

FIG. 4 is a transactional diagram showing the process for registration. In some embodiments, the registration of new users may be a responsibility of the e-commerce system 140 and not the vendor server 130. In the example shown in FIG. 4, the vendor server 120 maintains a registry of members and the e-commerce system 140 notifies the vendor server 120 regarding the authentication of the token. The vendor server 120 may transmit a message to the e-commerce system 140 to request a token (step 402). The e-commerce system 140 generates the token (step 403). The e-commerce system 140 transmits the token to the vendor server 120 (step 404). The vendor server 120 may then transmit an offer message in the form of an advertisement, or payment request, etc. with the token (step 405). This offer may be, for example, in an email message, where the token is embedded or attached to the email message. The customer may open the offer message using a customer device 150. The customer may send a response email by using a mailto hyperlink embedded in the offer message (step 406). The e-commerce system 140 receives the response email and validates the token (step 407). Once the token is validated, the e-commerce system 140 may send the transaction details to the vendor server 120 (step 408). The vendor server 120 parses the transaction details and may determine that the customer is unregistered (step 409). The vendor server 120 may then generate an email with an URL hyperlink and transmit the email to the customer (step 410). The URL hyperlink may direct the customer to a webpage. The customer, using a customer device 150 may navigate to the URL identified in the email message and register with the website (step 411). Once the customer is registered as a member of the website, the transaction details are sent to the payment processor 180 (step 412). The payment processor 180 may then process the payment (step 413) and notify the vendor server 120 that the payment has been processed (step 414). Once the payment has been processed, the vendor server 120 may send a notification that the transaction has been processed to the customer device 150. In the process described above, the vendor checks if the member is registered and if they are not registered they send an email to that customer that includes a URL hyperlink for signup and for purchasing the item that was identified in the token in the advertising email. The e-commerce system 140 validates the token only. If in processing an email a token is found to be invalid, (e.g., the code has been edited or deleted) the e-commerce system 140 may either notify the vendor server 120 (which may notify the customer) or e-commerce system 140 may send an email notification directly to the customer. While the example shown in FIG. 4 describes a single token used for a single customer, the e-commerce system 140 allows for scalability for large numbers of customers, each receiving one or more tokens. Accordingly, multiple tokens may be requested, generated and used.

In another example, version frame information may be incorporated with email targeted tokens. For email-target tokens, an initiator using a customer device 150 may compose an email request and add a list of recipients. When the initiator sends the email, the e-commerce system 140 may determine which recipients are registered with e-commerce system 140 and which are not. The e-commerce system 140 may send two separate emails—one to members and one to non-members. The members get an email checkout with mailto hyperlinks and the non-members get a link to the URL pay page and a sign up. The mailto hyperlinks sent to members may contain a token for processing a two-click email checkout. The token may comprise an embedded identifier of the email address of the recipient (that is the intended responder), along with the other necessary information required to complete the transaction. The intended recipient/responder may send a response email, using e.g. customer device 156, to the e-commerce system 140. If the response email contains the token, the e-commerce system 140 decodes the token, confirms that the embedded email address matches the address the token was submitted from, and, assuming all checks pass, the e-commerce system 140 processes the transaction. If an individual other than the intended recipient/responder returns the token to the e-commerce system 140, the process may fail when the email address contained in the token is compared to the submitting email address. This individual may receive an error notification instructing them to complete their purchase by clicking on URL to a payment page on which they may fill out their payment information and simultaneously register for an account with the e-commerce system 140. The version frame information may be adjusted depending on whether the email recipient is a registered member or non-registered user.

In another embodiment the e-commerce system 140 may be configured to perform the task of determining registration status. The e-commerce system 140 may therefore maintain a database of registered members. The e-commerce system 140 may also be responsible for sending the signup email.

Figure 5:
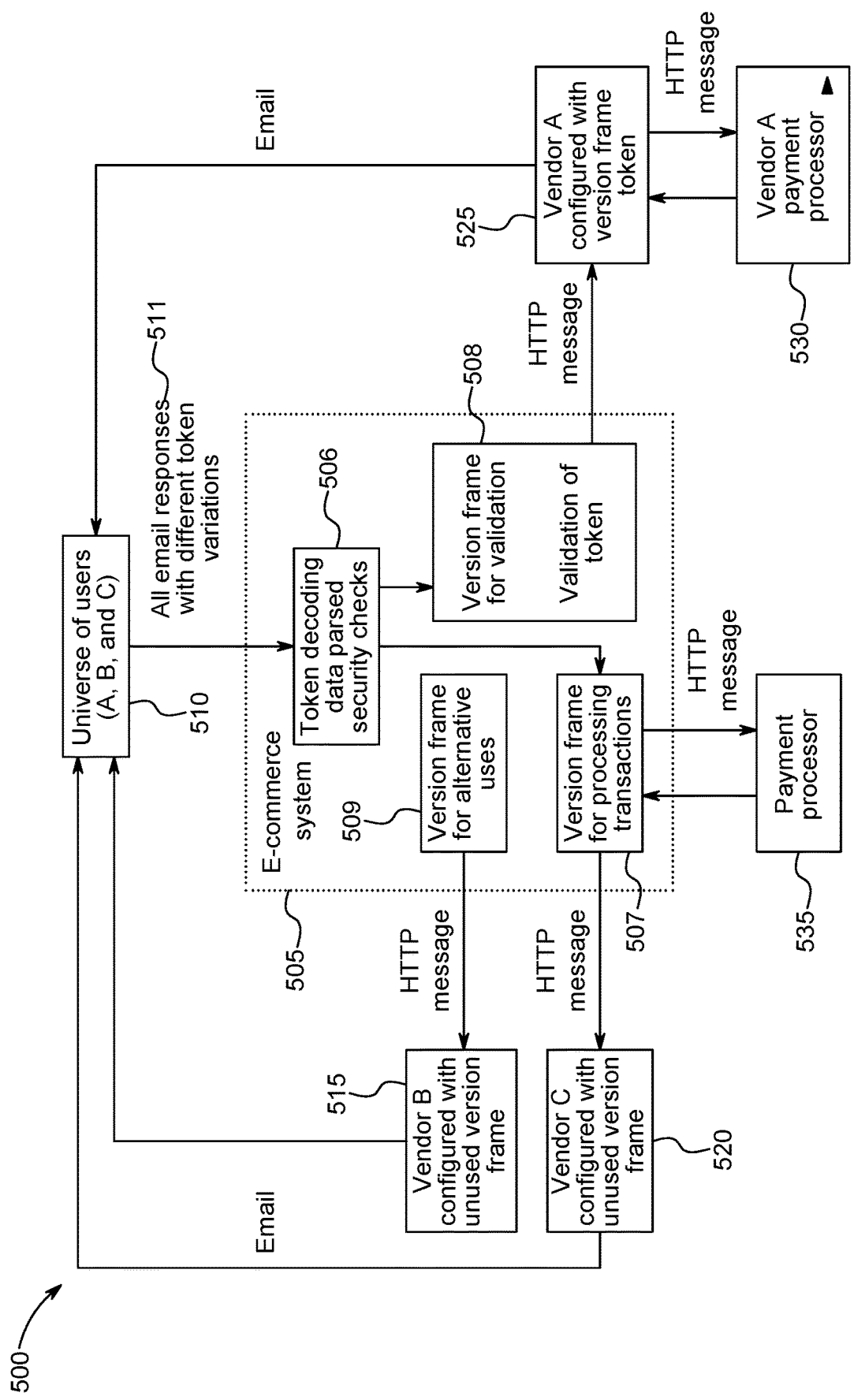
FIG. 5 is a transactional diagram of a system level example of different requests through the e-commerce system.

FIG. 5 shows a diagram of a system level example of different requests through an e-commerce system. As shown in FIG. 5, an e-commerce system 505 may be configured to communicate with a multiple users 510, multiple vendors 515-525, and a payment processor 535. The e-commerce system 505 is configured to communicate with multiple vendors which allows the e-commerce system 505 to use the version frame information to distinguish between validation and payment processing. As shown in FIG. 5, each vendor 515-525 may send an advertising email message or fundraising email message. These email messages may include mailto hyperlink(s) associated with a specific product or service or donation amount. These email messages may be sent to one or more email recipients embodied in the universe of users (e.g. individuals with an email address) 510. Generally, this email message may include multiple mailto hyperlinks representing multiple amounts. The email message may position mailto hyperlinks behind images of buttons that specify the product or the amount to be paid. One or more of these users 510 may select a mailto hyperlink. The mailto hyperlink generates an email message 511 with a token associated with the product and the message is addressed to the e-commerce system 505. (In another example, the vendor may generate their own tokens if the vendor adopts the token generator. See, e.g. U.S. patent application Ser. No. 14/216,227 entitled Vendor Token Generator, which is incorporated by reference in its entirety.) In the example shown, each vendor 515-525 requests a token for each mailto hyperlink and sends the email campaign to their users 510. That email message includes a token that will be used for a validation request. The token possesses the customer information and the product information and the version frame for validation.

Once the e-commerce system 505 receives the email message from a customer 510, the e-commerce system is configured to perform token decoding, data parsing and security checks 506.

The e-commerce system 505 may be configured to operate with multiple types of vendors. Some vendors may request the e-commerce system 505 to process the payment transactions and other vendors may wish to process their own payment transactions. The e-commerce system 505 may use the data in the version frame information to distinguish between validation and payment processing tokens In one example, shown in FIG. 5, the e-commerce system may analyze the version frame information and process the transaction 507. This may be for vendors that use the e-commerce system for processing transactions. In another example shown in FIG. 5, the e-commerce system may use the version frame information from a token to validate the token and allow the vendor to process the payment transaction 508. Additionally, the e-commerce system 505 may further be configured to decode the frame version information and perform various transactions 509 that may be determined based on the customer or vendor preference.

Figure 7:
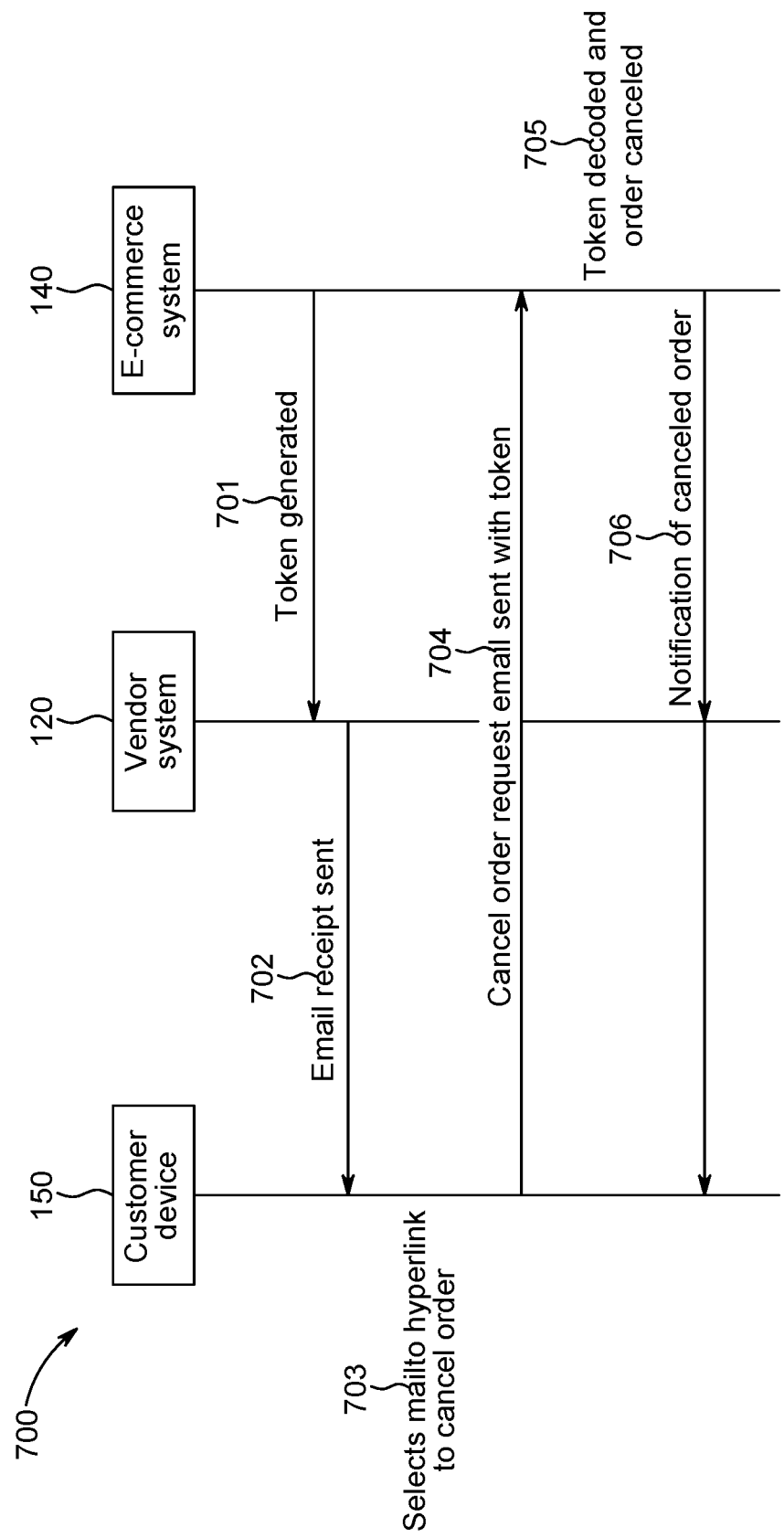
FIG. 7 shows a transactional diagram for a cancel request.

FIG. 7 shows a transactional diagram for a cancel request. The version frame may be used for a multiplicity of commands directed to different parts of the system. The customer may be offered a mailto hyperlink that generates an email request for an order (transaction) to be canceled. As shown in FIG. 7, the e-commerce system 140 may generate a token that is sent to the vendor server 120 (step 701). The vendor server 120 may then transmit an email receipt to the customer (step 702). The email receipt including a mailto hyperlink. A customer, using a customer device 150, may select the mailto hyperlink in the email receipt, indicating that they wish to cancel the order (step 703). The customer device 150 may then generate a cancel order request email in response to the mailto hyperlink being selected. This cancel order request email may contain the token that was generated by the e-commerce system 140 (or may be generated by the vendor server 120 in another embodiment). The cancel order request email is then transmitted to the e-commerce system 140 (step 704). The e-commerce system 140 receives the cancel order request email and parses the message. The e-commerce system 140 decodes the token and determines, based on the version frame that the message is a request to cancel the order. The e-commerce system 140 then cancels the order (step 705). The e-commerce system 140 then emails the customer informing them of the cancel order request status and providing any further instructions if further action is required (step 706). (The product is already shipped and they need to return the merchandise) This email may be sent from the e-commerce system 140 directly or from a third party. While FIG. 7 shows the cancel option being transmitted with a receipt, this cancel option may be offered in the original offer email or in a subsequent email. This cancel option may also be made in other confirmation messaging such as texting or social media.

In another example, if the payment and order process is held by the vendor server 120, the e-commerce system 140 may validate the email and notify the vendor server 120 and the vendor server 120 cancels the order. In the case where the e-commerce system 140 is processing the payment the e-commerce system 140 identifies the order and where the order is in the transaction process and respond by canceling the order outright, crediting the account and/or informing the vendor fulfilment of the canceled order request.

Figure 8:
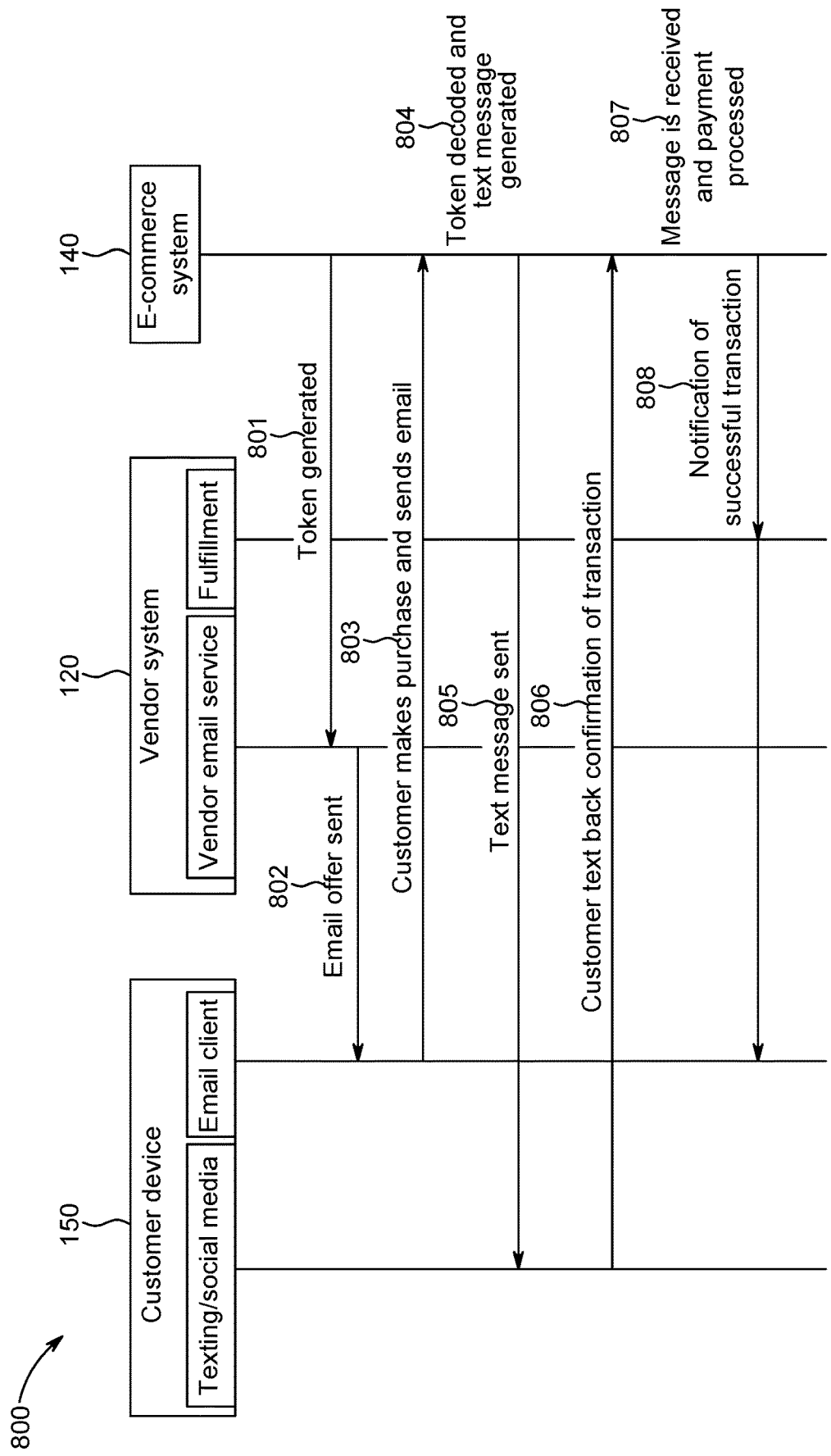
FIG. 8 is a transactional diagram for a text and social media confirmation feature.

FIG. 8 is a transactional diagram for a text and social media confirmation feature. A version frame is included in the token that notifies the system that a confirmation message is to be used before processing. The version frame may specify the type of confirmation message which may be sent via a different format such as text, instant message, TWEET or social media. This may provide additional protection against unauthorized transactions or may be used if the account is compromised. This may be used, for example, when the email account of the customer is compromised, if there is a mistake in the amount or a misunderstanding of the original advertising email, giving the customer a second chance to allow the transaction, if the ordered amount exceeds a predetermined limit. The e-commerce system 140 may generate a token, for example at the request of the vendor server 120 (step 801). The vendor server 120 may generate an email offer with a mailto hyperlink that includes the token. The vendor server 120 may send this email offer to a customer (step 802). The customer may select the mailto hyperlink, which may be associated with a product or service in the advertising email, and send the response email to the e-commerce system 140 (step 803). The e-commerce system 140 may receive the email, parse the information and decode the token and generate a text message (step 804). The e-commerce system 140 may a text, TWEET, FACEBOOK, or other social media post to the customer to confirm that the transaction should be processed (step 805). The message may or may not require action. The message may ask the customer to simply text a 'Yes' or 'No' response in order to allow the transaction or may not require any response or may only require a response to the negative or positive. The response message may be a link that will generate the response message or a link behind an image, icon or emoticon. In the embodiment where an response message is required the member may respond with simply a "Yes" to confirm the amount or for added security, there may be a predetermined "pin" number or password known only to the account holder and the authentication system. The customer, using a customer device 150 may respond by texting back a confirmation of the transaction (step 806). The confirmation message is processed by the email ecommerce system and the payment is processed (step 807). The e-commerce system 140 may transmit a message to the vendor server 120 and/or the customer notifying them of a successful transaction. The text and social media confirmation may also be used when signing up or when changing information within an account. An acknowledgment message may be sent whenever the account is accessed.

In another embodiment, the text or tweet or other social media message may have a series of responses that address several different problems, One may say "Text 'Yes' to confirm this order" another may say "Text 'Cancel' to cancel this order" another may say "Text 'Wrong' if this order is incorrect" and "Text 'Lock' if you think your email account has been compromised" In this later example, a registered customer who receives a text message of a transaction which they did not authorize and messages 'Lock' freezes their account. The payment is not processed and the account is frozen until the customer can be authenticated. If the customer does lock the account they receive additional text and email describing how to access their account and reset the security password or will instruct them to cancel their payment method i.e. debit or credit card or direct carrier billing system.

Figure 9:
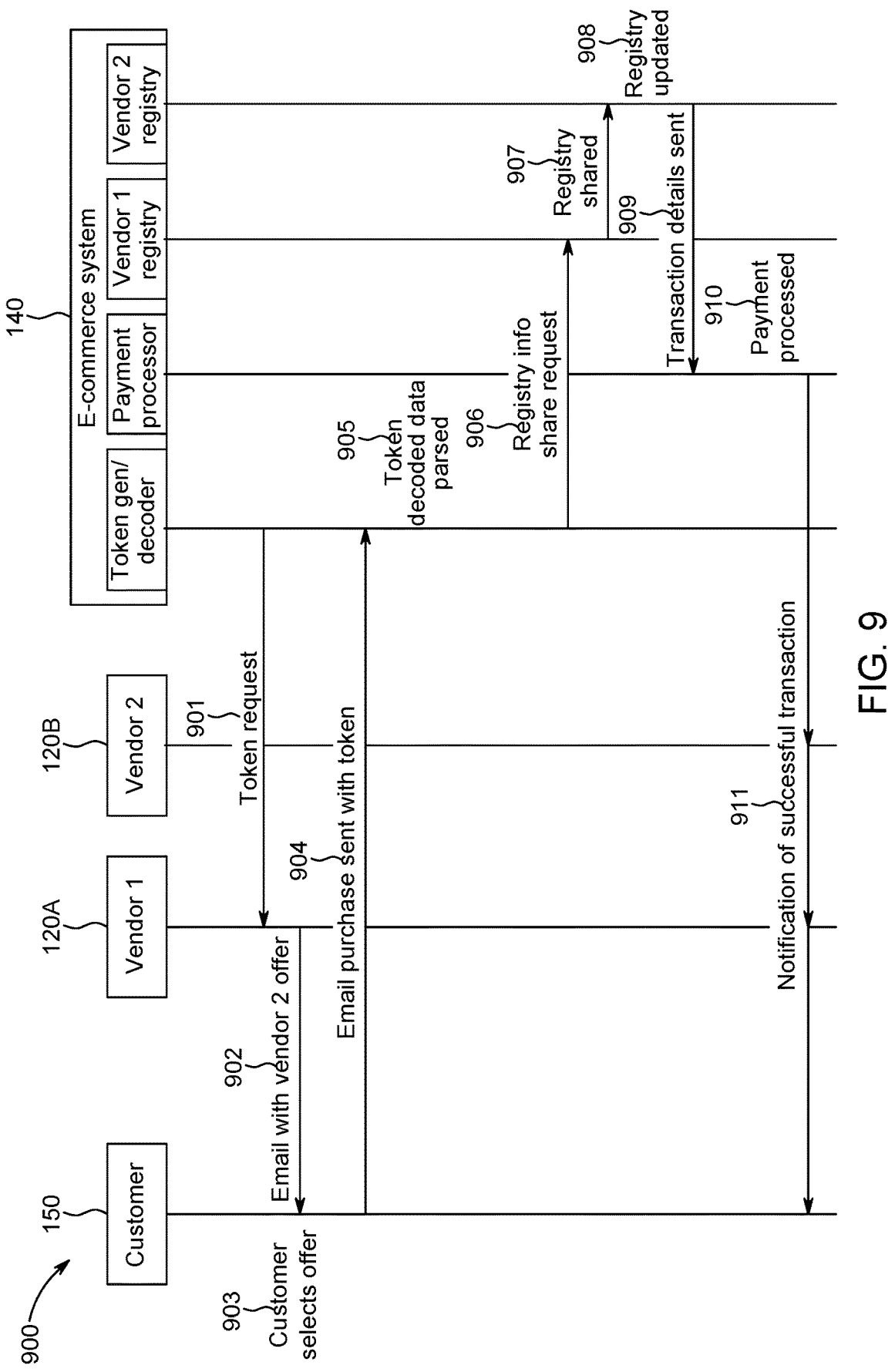
FIG. 9 shows a transaction diagram for a cross promotion feature.

FIG. 9 shows a transaction diagram for a share-a-vendor or cross promotion feature. In the case of a share-a-vendor or cross-promotion where a vendor includes an offer in their email for the benefit of one or more additional vendors (such as a cross promotion between retailers or where one of the additional vendors is a nonprofit). The vendor may include an offer in an advertising campaign that is for the other vendor or nonprofit. Each offer may be accompanied by a mailto hyperlink and when selected generate an email addressed to the e-commerce system. As shown in FIG. 9, the e-commerce system 140 may send a plurality of tokens to a vendor 120a (step 901). The tokens may be associated with vendor 120a and vendor 120b. The vendor 120a may send an email message to the customer (step 902). The email message may include information that explains that the customer is going to make a purchase from a new vendor and that the customer information registered with e-commerce system 140 may be shared with the new vendor 120b, and by sending a response email the customer account may be associated with the new vendor 120b. There may also be an opt-in agreement to future email campaigns of the new vendor 120b as well as terms and conditions of the product purchase. The customer may then select an offer by selecting a mailto hyperlink (step 903). The customer may then send the response email to purchase an item (step 904). The e-commerce system 140 receives the token, decodes the token and parses the data within the token (step 905). The e-commerce system 140 may recognize the version frame as a cross promotion offer. The e-commerce system confirms the member and performs security checks. The e-commerce system 140 may access the customer's information and share it with the new vendor and notify the new vendor of the addition (steps 906-908). The information may be shared within the e-commerce system 140 by updating the registry to associate the customer's information with the second vendor. The e-commerce system 140 may then process the payment and send a receipt and or a notification of the modification of the customer's account details (steps 910-911). In a different embodiment the e-commerce system may send an additional email before sharing information registered with the e-commerce system 140 and processing the payment to confirm that the customer authorizes the sharing of information.

In another embodiment the e-commerce system 140 may respond with a URL link requesting a password confirmation. This may be for confirming the identity of the customer or for clarification of account or order information.

In another embodiment a new member request may not be for a payment processing but for sharing of information registered with the e-commerce system 140 or an opting in of email information. This may allow the new vendor 120b to solicit from the customer or initiate other calls to action at a later date. An example of this may be if a retailer included a link to join a charity. Or if asked to add a customer's name to a letter to advocate for a cause. They may in turn send an email to solicit donations.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or Bluray-Disc, or other type of device for electronic data storage.

Although the methods and features described above with reference to FIGS. 2-9 are described above as performed using the example system 100 of FIG. 1, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-9 may be used alone without the other features and elements or in various combinations with or without other features and elements. Sub-elements of the methods and features described above with reference to FIGS. 1-9 may be performed in any arbitrary order (including concurrently), in any combination or sub-combination.

What is claimed is:

1. A method that improves security of a transaction by utilizing Simple Mail Transfer Protocol (SMTP), the method comprising:

receiving, by a device of a user, a selection of a mailto link displayed on a website of a vendor server;
in response to the selection of the mailto link, executing by the device, an executable causing the device to perform the steps of:
  generating an email response message addressed to an e-commerce system,
  embedding a token to the email response message, wherein the token comprises a version frame and an email address of the user, and
  sending the email response message to the e-commerce system; and
on a condition that the user is authenticated by the e-commerce system, receiving, by the device, a confirmation message from the vendor server,
wherein the user is authenticated by the e-commerce system:
  decoding the token contained in the email response message to determine the version frame and the email address of the user,
  validating the token based on the determination of the version frame and the email address of the user, and
  sending a validation message to the vendor server based on the validating.

2. The method of claim 1, wherein the token is a validation token, wherein the validation token includes IP address, or MAC address.

3. The method of claim 1, wherein the version frame indicates to the e-commerce system that the token is to be used for validation.

4. The method of claim 2, wherein the version frame indicates an address of a third party system to the e-commerce system.

5. A non-transitory computer readable storage medium that stores instructions for improving security of a transaction by utilizing Simple Mail Transfer Protocol (SMTP), the instructions when executed a processor of a device of a user cause the device to perform a method comprising:
receiving a selection of a mailto link, wherein the mailto link is displayed on a website of a vendor server;
in response to the selection of the mailto link, performing a mail generation process, wherein the mail generation process includes:
  generating an email response message addressed to an e-commerce system,
  embedding a token to the email response message, wherein the token comprises a version frame and an email address of the user, and
  sending the email response message to the e-commerce system; and
on a condition that the user is authenticated by the e-commerce system, receiving a confirmation message from the vendor server,
wherein the user is authenticated by the e-commerce system:
  decoding the token contained in the email response message to determine the version frame and the email address of the user,
  validating the token based on the determination of the version frame and the email address of the user, and
  sending a validation message to the vendor server based on the validating.

6. The non-transitory computer readable storage medium of claim 5, wherein the token is a validation token, wherein the validation token includes IP address, or MAC address.

7. The non-transitory computer readable storage medium of claim 5, wherein the version frame indicates to the e-commerce system that the token is to be used for validation.

8. The non-transitory computer readable storage medium of claim 6, wherein the version frame indicates an address of a third party system to the e-commerce system.

9. A device for use in a transaction that utilizing Simple Mail Transfer Protocol (SMTP) to secure the transaction, the device comprising:
a communication interface that is communicatively coupled to an e-commerce system and a vendor server;
an input device that receives an input from a user; and
one or more processors that are communicatively coupled to the communication interface and the input device,
wherein the one or more processors are collectively configured to:
receive, using the input device, a selection of a mailto link that is displayed on a website of the vendor server;
in response to the selection of the mailto link, perform a mail generation process, wherein the mail generation process includes:
  generating an email response message addressed to the e-commerce system,
  embedding a token to the email response message, wherein the token comprises a version frame and an email address of the user, and
  sending, using the communication interface, the email response message to the e-commerce system; and
on a condition that the user is authenticated by the e-commerce system, receive, using the communication interface, a confirmation message from the vendor server,
wherein the user is authenticated by the e-commerce system:
  decoding the token contained in the email response message to determine the version frame and the email address of the user,
  validating the token based on the determination of the version frame and the email address of the user, and
  sending a validation message to the vendor server based on the validating.

10. The device of claim 9, wherein the token is a validation token, wherein the validation token includes IP address, or MAC address.

11. The device of claim 9, wherein the version frame indicates to the e-commerce system that the token is to be used for validation.

12. The device of claim 10, wherein the version frame indicates an address of a third party system to the e-commerce system.

13. The method of claim 1, further comprising:
on a condition that the user is not authenticated by the e-commerce system, receiving, by the device, a failure message from the vendor server, and
displaying, by the device, a message to the user in response to the failure message, wherein the message is displayed in a browser of the device.

14. The method of claim 1, further comprising:
displaying, by the device, the confirmation message in a web browser of the device.

15. The non-transitory computer readable storage medium of claim 5, wherein the method further comprises:
on a condition that the user is not authenticated by the e-commerce system, receiving, by the device, a failure message from the vendor server, and displaying, by the device, a message to the user in response to the failure message, wherein the message is displayed in a browser of the device.

16. The non-transitory computer readable storage medium of claim 5, wherein the method further comprises:
displaying, by the device, the confirmation message in a web browser of the device.

17. The device of claim 9, wherein the one or more processors are further collectively configured to:
on a condition that the user is not authenticated by the e-commerce system, receive, by the device, a failure message from the vendor server, and
display, by the device, a message to the user in response to the failure message, wherein the message is displayed in a browser of the device.

18. The device of claim 9, wherein the one or more processors are further collectively configured to:
display, by the device, the confirmation message in a web browser of the device.

\* \* \* \* \*